United States Patent
Frankel et al.

(10) Patent No.: US 7,696,453 B2
(45) Date of Patent: Apr. 13, 2010

(54) CHROMIUM-FREE WELDING CONSUMABLE

(75) Inventors: Gerald S. Frankel, Columbus, OH (US); John C. Lippold, Hillard, OH (US)

(73) Assignee: The Ohio State University Research Foundation, Columbus, OH (US)

(*) Notice: Subject to any disclaimer, the term of this patent is extended or adjusted under 35 U.S.C. 154(b) by 0 days.

(21) Appl. No.: 12/029,164

(22) Filed: Feb. 11, 2008

(65) Prior Publication Data

US 2008/0173701 A1 Jul. 24, 2008

Related U.S. Application Data

(63) Continuation-in-part of application No. 11/090,976, filed on Mar. 25, 2005, now Pat. No. 7,425,229.

(60) Provisional application No. 60/557,031, filed on Mar. 26, 2004.

(51) Int. Cl.
  *B23K 35/34* (2006.01)
  *B23K 35/40* (2006.01)
  *C22C 19/03* (2006.01)

(52) U.S. Cl. ............... 219/145.23; 420/457; 228/101; 148/24; 219/145.22

(58) Field of Classification Search ............ 219/145.22, 219/145.23; 420/457; 228/101; 148/24
  See application file for complete search history.

(56) References Cited

U.S. PATENT DOCUMENTS

| | | | |
|---|---|---|---|
| 2,815,282 A | 12/1957 | Rhodes et al. | |
| 3,450,527 A | 6/1969 | Tanzman | |
| 3,584,187 A | 6/1971 | Majetich et al | |
| 3,909,253 A | 9/1975 | Asnis et al. | |
| 4,149,063 A | 4/1979 | Bishel | |
| 4,218,245 A | 8/1980 | Batova et al. | |
| 4,497,772 A | 2/1985 | Mizuhara | |
| 4,704,338 A * | 11/1987 | Landingham et al. | 428/627 |
| 4,764,435 A * | 8/1988 | Hosizaki et al. | 428/621 |
| 4,785,137 A * | 11/1988 | Samuels | 174/559 |
| RE33,186 E | 3/1990 | Mori et al. | |

(Continued)

FOREIGN PATENT DOCUMENTS

GB 976660 12/1964

(Continued)

OTHER PUBLICATIONS

Schwartz, Melvin M. "Introduction to Brazing and Soldering." dowloaded from http://products.asminternational.org/hbk/do/highlight/content/V06/D02/A01/index.html on Apr. 29, 2009. copyright 2009 ASM International.*

*Primary Examiner*—George Wyszomierski
*Assistant Examiner*—Tima M McGuthry-Banks
(74) *Attorney, Agent, or Firm*—Dinsmore & Shohl LLP

(57) ABSTRACT

A chromium-free welding consumable and a method of welding stainless steel to reduce the presence of chromium emissions. The consumable is made from an alloy that reduces the emission of chromium during a welding process, and include predominantly nickel, with between approximately five and ten weight percent copper, up to approximately two percent by weight of ruthenium and up to five percent non-copper alloying ingredients. Welding consumables made from the alloy are particularly well-suited for welding austenitic stainless steels, such as type 304 stainless steel. The method involves using chromium-free weld filler material with a stainless steel base material.

21 Claims, 9 Drawing Sheets

U.S. PATENT DOCUMENTS

| | | |
|---|---|---|
| 5,171,968 A | 12/1992 | Bates et al. |
| 5,236,661 A | 8/1993 | Hidaka et al. |
| 6,613,159 B1 | 9/2003 | Koch et al. |
| 2004/0160155 A1 | 8/2004 | Partlo et al. |

FOREIGN PATENT DOCUMENTS

| | | |
|---|---|---|
| GB | 2128528 A | 5/1984 |
| JP | 55027481 | 2/1980 |
| JP | 56095490 | 8/1981 |
| JP | 56127707 A | 10/1981 |
| JP | 2001047235 A | 2/2001 |
| JP | 2004017118 A | 1/2004 |
| RU | 2098247 | 12/1997 |

* cited by examiner

CHROMIUM-FREE WELDING CONSUMABLE

CROSS-REFERENCE TO RELATED APPLICATION

This application is a continuation in part of application Ser. No. 11/090,976, now U.S. Pat. No. 7,425,229 filed Mar. 25, 2005. This application claims the benefit of the filing date of U.S. Provisional Application No. 60/557,031, filed Mar. 26, 2004.

STATEMENT REGARDING FEDERALLY SPONSORED RESEARCH OR DEVELOPMENT

This invention was supported by the government under Contract No. DACA 72-03-P-0014 awarded by the Department of Defense under the Strategic Environmental Research and Development Program. The government has certain rights in the invention.

BACKGROUND OF THE INVENTION

This invention relates generally to chromium-free welding materials, and in particular to a chromium-free welding consumable and methods employing such consumables for joining or repairing stainless steel base metals, where the weld retains its structural and corrosion properties, even in harsh environments.

Stainless steels or, more precisely, corrosion-resisting steels are a family of iron-base alloys having excellent resistance to corrosion. These steels do not rust and strongly resist attack by a great many liquids, gases, and chemicals. Stainless steels are generally divided into three classes, austenitic, ferritic or martensitic (with a possible austenitic-ferritic duplex class), depending on the predominant microstructural phase. Many of the stainless steels have good low-temperature toughness and ductility, and generally exhibit good strength properties and resistance to scaling at high temperatures. All stainless steels contain iron as the main element and chromium (Cr) in amounts ranging from about 11 to 30 percent, where the presence of Cr in such concentrations enhances corrosion resistance. In the present disclosure, both the atomic symbol (for example, Cr) and its full name are used interchangeably. Additional elements, such as nickel, manganese, silicon, carbon and molybdenum, may be added to impart other desirable properties. Of the three classes, the austenitic stainless steels have the best combination of corrosion resistance, mechanical properties, and weldability, where their corrosion resistance is due at least in part to the high Cr content and nickel additions. An example of an austenitic stainless steel is the American Iron and Steel Institute (AISI) number 304 stainless steel, also called "type 304 stainless steel", "304 stainless steel" or merely "type 304". Specific variants of type 304 stainless steel, such as 304L (for low carbon) are often used in naval and related applications.

Stainless steel components are often joined by welding. Consumable filler metals matching or exceeding the Cr content of the base metal have proven to be effective in ensuring that the welds exhibit sufficient corrosion resistance. Existing filler material for welding the various stainless steel base metals, based on Unified Numbering System (UNS) designations include austenitic (UNS Nos. W30810, W30910, W31010, W31610, W31710 and W34710), martensitic (UNS Nos. W41010 and W42010 and ferritic (UNS Nos. S40900 and S43080) formulations. For austenitic stainless steels, such as type 304, the Cr content of the welding consumable is generally between 18 and 20 percent by weight.

During many welding processes, evaporation and oxidation of Cr from the molten weld pool results in the emission of hexavalent Cr that is present in the fumes. In fact, the consumable filler material is typically the major source of welding fumes, sometimes accounting for over 80 percent of the shielded metal arc welding (SMAW) weld metal. Accordingly, the possibility exists for significant generation of hexavalent Cr in the weld fumes. While there are several valence states of Cr (the composition and oxidation state of which depends strongly on the process details such as arc voltage, type of filler material, welding current and the presence of a shielding gas in the welding atmosphere), it is the hexavalent Cr compounds (Cr VI) that are of particular interest, as they are suspected of leading to lung cancer and other health problems. The problem of a Cr VI-rich local atmosphere is exacerbated when the welding is conducted in confined and related spaces lacking adequate ventilation. For example, welding onboard a ship typically involves a manual process using an arc method (such as SMAW or a related electric arc method), which has been shown to generate considerable amounts of fume, up to 0.3 g/min or 8 g/kg of deposit. While these hazardous conditions can be somewhat meliorated by adequate ventilation, such ventilation can be extremely difficult to implement in many situations.

An outgrowth of such significant potential health hazards is that these and other welding operations have been under increased scrutiny recently. For example, the U.S. Department of Labor's Occupational Safety and Health Administration (OSHA) recently decreased the permissible exposure limit (PEL) on CrVI from 52 to 5 mg/m$^3$ as CrVI. Manganese (Mn)-bearing fumes are also a concern for manganese toxicity, which affects the central nervous system. As with hexavalent Cr, Mn has been the focus of considerable recent attention, where the OSHA PEL has been set at 5 mg/m$^3$, with the NIOSH REL of 1 mg/m$^3$.

Accordingly, there is a need for developing a consumable for welding austenitic stainless steel that is Cr- and Mn-free to limit the generation of dangerous emission of these metals in the welding fumes.

SUMMARY OF THE INVENTION

This need is met by the present invention, where consumables made from Cr-free alloys are suitable for use as a weld material for austenitic stainless steels. According to a first aspect of the present invention, a substantially Cr-free welding material is disclosed, where ruthenium (Ru) can be used in place of other platinum-group metals. Specifically, a nickel-based alloy with between five and ten percent copper (Cu) and up to approximately two percent Ru can be used in a weld material to be used for welding stainless steel. A balance of nickel and up to five weight percent other alloying ingredients can be used. The addition of copper to nickel also improves the corrosion behavior and ennobles the corrosion potential, and the inventors have determined that while a relatively broad range of copper concentrations is beneficial, concentrations in the five to ten weight percent range demonstrate even more corrosion resistance for harsh environments.

Importantly, welding fumes from a weld pool produced by welding stainless steel with the above composition contains substantially no hexavalent Cr. In the present, the term "substantially no" or its variants does not necessarily mean that no hexavalent Cr is produced, merely that the amounts produced are not contributed to by the welding consumable. In this way, far less hexavalent Cr is produced than with a welding material of the prior art. Thus, hexavalent Cr concentration reductions by an order of magnitude or more would qualify as "substantially no" hexavalent Cr relative to that produced by a comparably-performing prior art weld material. By way of a non-limiting example, if a welding fume composition from a weld material of the prior art contains ten weight percent Cr, a welding fume composition from a comparably-performing weld material of the present invention would produce less than one weight percent Cr. A prior art weld material is considered to be "comparably-performing" when it possesses corrosion and mechanical properties similar to those of the present invention such that either are suitable for the design criteria of the welding application in question. For example, over ninety percent or more (often over ninety five percent) of the welding fume that is generated comes from the welding consumable, while significantly smaller amounts come from other sources, such as vaporization from the surface of the molten weld pool Optionally, the material is configured as a component, such as a wire (including a flux cored wire) and a coated electrode. In another option, the up to approximately two weight percent ruthenium is present between approximately one weight percent and approximately two weight percent, with a more particular range of between approximately 1.3 weight percent and approximately 1.4 weight percent ruthenium. In addition, the material may include more specific quantities of other ingredients, such as copper, wherein the between approximately five percent and approximately ten weight percent copper comprises approximately eight weight percent copper. In a more specific option, the between approximately 1.3 weight percent and approximately 1.4 weight percent ruthenium comprises approximately 1.36 weight percent ruthenium, while the approximately eight weight percent copper comprises approximately 8.2 weight percent copper. In still another option, the between approximately five weight percent and approximately ten weight percent copper comprises approximately ten weight percent copper. In still another option, at least some of the alloying ingredients are elements, including one or more of carbon (C), boron (B), nitrogen (N), manganese (Mn), silicon (Si), tungsten (W), tantalum (Ta), niobium (Nb), vanadium (Va), titanium (Ti), aluminum (Al), oxygen (O), phosphorous (P) and sulfur (S). As mentioned above, the Cu content of between approximately 5 weight percent and approximately 10 weight percent can be more specific, for example, approximately 7.5 weight percent in one embodiment. Moreover, the up to 5 weight percent other alloying ingredients may include approximately 0.5 weight percent Al, approximately 0.5 weight percent Ti and approximately 0.02 weight percent C, although other higher quantities of Al and Ti, for example, up to approximately 2 weight percent each, may also be used.

According to another aspect of the invention, a substantially Cr-free nickel-based welding consumable is disclosed. The consumable includes up to approximately 10 weight percent Cu, between approximately 1 and 2 weight percent Ru and up to 5 weight percent other alloying ingredients such that the device is defined by a corrosion potential at least as high as a stainless steel workpiece to which the consumable is configured to be joined, a breakdown potential greater than the workpiece and a repassivation potential greater than the workpiece.

Optionally, the welding consumable contains between approximately 5 and approximately 10 weight percent Cu, with a more particular range of between approximately 7.5 and approximately 10 weight percent, and an even more particular concentration of approximately 8.2 weight percent, while the Ru content is approximately 1.4 weight percent. In another configuration, the welding consumable comprises approximately 10 weight percent Cu and approximately 1 weight percent Ru. In yet another configuration, the welding consumable comprises approximately 7.5 weight percent Cu and approximately 1 weight percent Ru. This configuration may further comprise approximately 0.5 weight percent of each Al and Ti and up to approximately 0.1 weight percent C. Al and Ti are particularly well-suited as de-oxidizing agents.

According to yet another aspect of the invention, a method of welding a stainless steel base material is disclosed. The method includes providing a Cr-free welding consumable and welding the base material with the welding consumable to produce a welded composition such that fumes from a weld pool produced by the welding contain a substantially reduced level of hexavalent Cr relative to that which would be produced using a Cr-containing welding consumable. The consumable includes between approximately 5 weight percent and approximately 10 weight percent Cu, approximately 1 to approximately 2 weight percent Ru and a balance of Ni and up to 5 weight percent other alloying ingredients. As with the discussion related to the first aspect of the invention, the term "substantially reduced level" (and its variants) of hexavalent Cr are intended to convey the inventors' intent that more than incremental reductions in hexavalent Cr are envisioned by operation of the materials, consumables and methods of the present invention. As such, reductions of an order of magnitude or more would qualify as a "substantial" reduction in hexavalent Cr presence in the weld fume.

In one form, the base material comprises an austenitic stainless steel, for example, type 304 stainless steel. The Cu concentration can be any of those previously discussed, as can the other alloying ingredients. For example, the up to 5 weight percent other alloying ingredients may include approximately 2 weight percent Al, approximately 2 weight percent Ti and up to 0.1 weight percent C. Smaller quantities of Ti and Al may also be used; for example, approximately 0.5 weight percent of either may be included. Similarly, the Ru concentration can be the same as that previously discussed, for example approximately 1 to 2 weight percent generally, and more particularly between approximately 1.3 weight percent and approximately 1.4 weight percent.

DETAILED DESCRIPTION OF THE INVENTION

The present inventors have determined that Cr-free welding consumables made from nickel alloys containing copper, palladium (Pd) and molybdenum (Mo) are suitable for use as a weld metal for type 304 stainless steel. Elimination of Cr from the filler metal leads to significant reduction of the Cr content in fumes generated when welding a type 304 base metal workpiece. The present inventors have also determined that by controlling dilution of the filler metal by the base metal, these welds also exhibit good weldability by GTAW (formerly known as tungsten inert gas (TIG) welding). The strength of these welds is comparable to welds made with standard 308L filler metal, exhibiting sufficient corrosion resistance in dilute chloride solutions, such as 0.1M NaCl solutions. The present inventors have also discovered that under certain circumstances (for example, more aggressive environments), weld consumables that employ lower concentrations of copper (for example, between five and ten percent by weight) may exhibit even further improvements over consumables with relatively high quantities of copper.

If a stainless steel (such as type 304 or its low carbon variant) base metal is to be welded with a filler metal that is different in composition than the base metal, then the corrosion of the welded structure will be controlled by the galvanic interaction between the base metal and resulting weld metal. Stainless steel exhibits corrosion resistance because of the presence of a thin Cr-rich oxy-hydroxide surface film, the so-called passive film, which forms spontaneously upon exposure of a fresh metal surface to air or aqueous solution. However, stainless steel, like other passive metals, is susceptible to localized corrosion in chloride-containing environments. In fact, the corrosion of passive metals such as stainless steels is often localized in nature, where localized corrosion in the form of pits and crevices will occur above a characteristic breakdown potential in a given environment. Thus, one design criterion for preventing localized corrosion is to require that the corrosion potential stay lower than the breakdown potential. Nevertheless, localized corrosion has been shown to propagate at potentials lower than the breakdown potential. Therefore, a more conservative design criterion is that the corrosion potential must stay below a characteristic repassivation potential that is lower than the breakdown potential.

Figure 1:
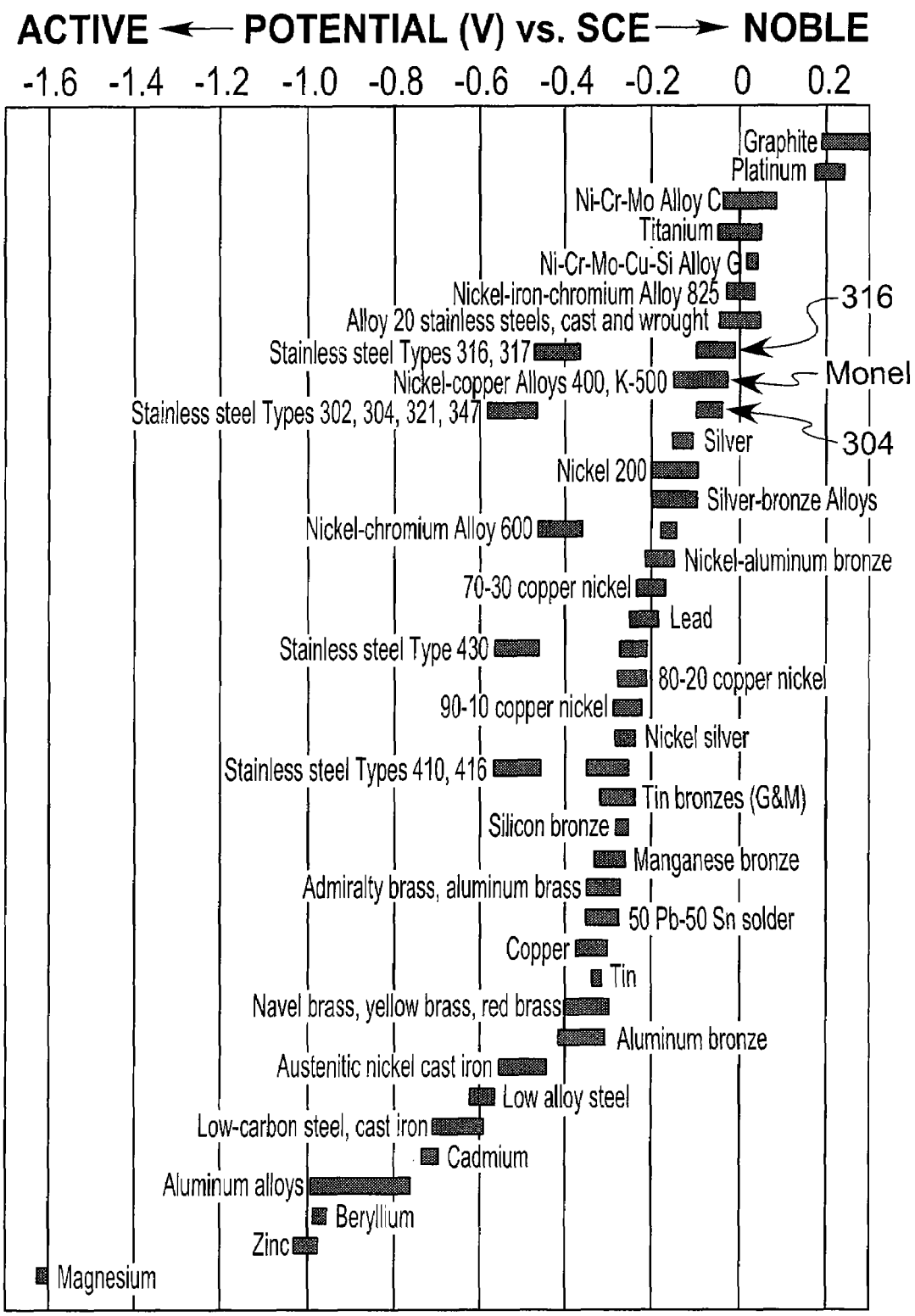
FIG. 1 is the known galvanic series for seawater.

When two different metals are electrically coupled (as are a weld and a base metal workpiece) and exposed to the same environment, galvanic interactions will occur. Referring first to FIG. 1, the more active, or less-noble, metal (i.e., the one with the lower corrosion potential in that environment) will undergo accelerated attack and the more noble metal will be protected. This galvanic protection is a form of cathodic protection for the more noble metal, and is the mechanism for the well-known corrosion protection of a steel substrate by a zinc coating in a galvanized structure. The materials farther to the right in the figure are more noble, those farther to the left, less so. The ranges of potentials for types 304 and 316 are indicated, while that of the nickel-copper alloys 400 and K-500 are located between the two.

One key aspect in galvanic coupling is the area ratio of the two metals. It can be shown that $i_a$, the anodic current density or corrosion rate of the anode or less noble metal, depends upon the ratio of the areas of the cathode and anode, $A_c$ and $A_a$, and the current density at the cathode, $i_c$, according to:

$$i_a = \frac{A_c}{A_a} i_c \quad (1)$$

If one area is significantly larger than the other, then the galvanic potential of the couple is pinned at the uncoupled corrosion potential of the larger metal. For a welded stainless steel structure, the area of the weld metal is much less than the area of the substrate being welded, which means that the potential of the weld will be set by the corrosion potential of the stainless steel in the particular environment. If the weld metal is less noble than the stainless steel, the galvanic coupling will result in an increase in the potential of the weld. This can result in aggressive attack of the weld if the stainless steel corrosion potential is above the breakdown potential of the weld, or if the less noble weld metal does not passivate and dissolves actively. However, if the weld metal is noble relative to the stainless steel, then the galvanic coupling will result in cathodic protection of the weld metal by the stainless steel.

The inventors have found that it is possible to use the fundamental principles outlined above to develop design criteria for a new weld metal for stainless steel. The design criteria are as follows: (1) the breakdown and repassivation potentials of the weld metal should be higher than the corrosion potential of the stainless steel substrate to prevent localized attack of the weld metal; and (2) if possible, the corrosion potential of the weld metal should be slightly higher than that of the stainless steel substrate so that the weld metal is cathodically protected.

Weldability Tests

To determine the applicability of various welding consumables, the inventors conducted numerous weldability tests of stainless steel with Alloy 400, commonly known under the trade name Monel®, which, as shown in the figure, is galvanically compatible with 304 stainless steel. Monel® contains 31 percent copper (typical value), and maximum concentrations of 2.5 percent iron (Fe), 2 percent manganese, 0.5 percent silicon, 0.3 percent carbon and 0.024 percent sulfur (S). Monel® has good corrosion, erosion and cavitation resistance in seawater and is widely used in seawater under conditions of high flow velocity such as propellers, shafts, condenser tubes and heat exchangers. While Monel® has been used to weld Monel® substrates, the present inventors are unaware of any attempt to use it to weld stainless steel substrates for the purpose of reducing Cr emissions.

Figure 7:
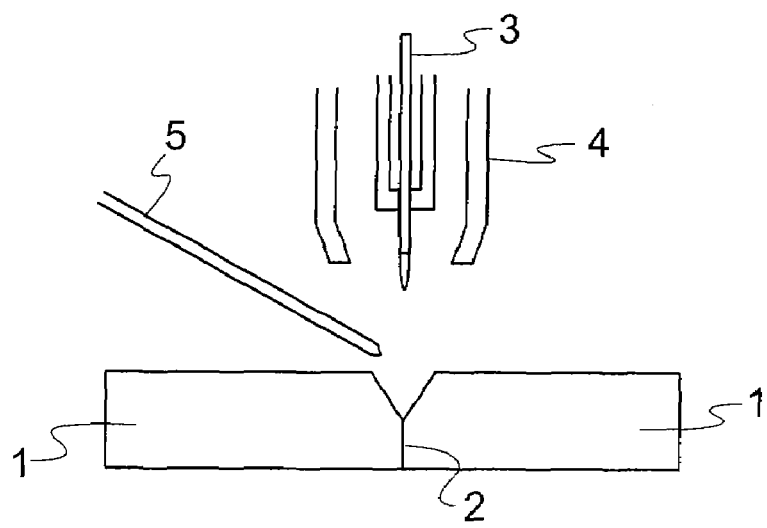
FIG. 7 illustrates a gas tungsten arc welding (GTAW) process.

Referring next to FIG. 7, a welding configuration for GTAW is shown, where electrode 3 was placed above welding workpiece (also referred to as base material) 1 having weld joint 2 at the edge to be welded. Electrode 3 is brought close to the joint area, where a direct electric current of 150 A at a voltage of 12V is applied to generate an electric arc between base material 1 and electrode 3. Using this setup, weld rods 5 were fused and deposited along the notch adjacent the weld joint 2 while using an inert gas (for example, argon) from gas nozzle 4 surrounding electrode 3 to cover the area to be welded and thereby minimize or eliminate atmospheric influences.

Welds were made using ¼" 304L base metal and 0.045" diameter commercially-available ERNiCu-7 (Monel® 60) or standard 308L stainless steel filler wire using the GTAW process. The calculated weld metal composition for Monel® 60 welds at two different dilutions and threshold composition values for maintaining good weldability are listed, along with the compositions of these materials, in Table 1.

TABLE 1

Composition range of Monel ® filler metal and 304L base metal.

| Element (wt %) | Monel ® 60 Wire | 304L SS | 15% Dilution calculated | 40% Dilution calculated | Weldability Threshold Value |
|---|---|---|---|---|---|
| Ni | 63.99 | 8.08 | 55.60 | 41.63 | unlimited |
| Cu | 28.81 | — | 24.49 | 17.29 | unlimited |
| Fe | 0.76 | 72.10 | 11.46 | 29.30 | 15 |
| Cr | — | 18.09 | 2.71 | 7.24 | 6 |
| Mn | 3.49 | 1.24 | 3.15 | 2.59 | unlimited |
| Ti | 1.99 | — | 1.69 | 1.19 | not reported |
| Si | 0.90 | 0.37 | 0.82 | 0.69 | 1.5 |
| N | — | 0.06 | 0.01 | 0.02 | not reported |
| C | 0.05 | 0.03 | 0.05 | 0.04 | 0.4 |
| Others | 0.01 | 0.03 | 0.01 | 0.02 | |

Also shown in Table 1 are the calculated values of weld metal composition for 15 and 40% dilution for the 304L base metal and Monel® 60 filler metal. This represents a typical range for most arc welding processes. In the present context, "dilution" is defined as dilution of the filler metal by the base metal. The threshold composition values given in the last column of the table suggest that the weld dilution should be kept below 40% to avoid solidification cracking. GTAW was the welding process used in this test because it is easier to automate and control than the most common process for manual welding of stainless steel, SMAW. Details of the GTAW process are given in Table 2.

TABLE 2

Details of GTAW procedure

| | |
|---|---|
| Current | 150 Amp |
| Voltage | 12 V |
| Travel speed | 5 in/min |
| Heat input | 21.6 kJ/in (0.85 kJ/mm) |
| Wire feed speed | 45 in/min |
| Shielding gas | Argon + 5% H$_2$ |
| Shielding gas flow rate | 30 cubic ft/min |
| Joint design | V-groove 90°, gap: 0.118 in |

Figure 2:
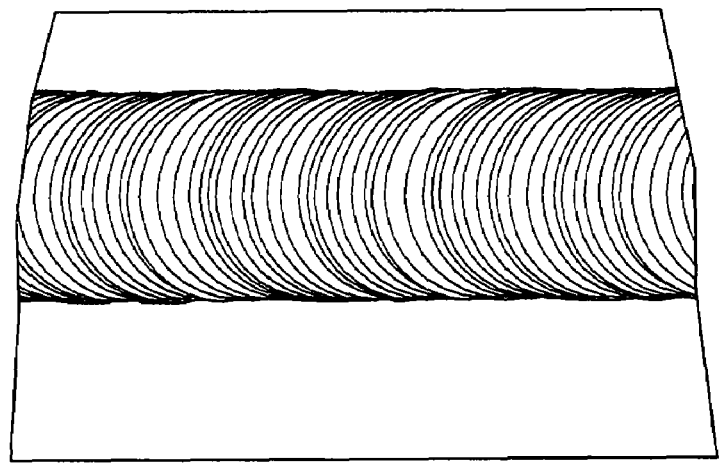
FIG. 2 shows a Monel®/304L weld with the ends etched.

Referring next to FIG. 2, an example of a weld achieved with a Monel® 60-based consumable is shown. As described below, the 304/Monel® 60 weld structure exhibited good corrosion resistance to dilute chloride solutions, but was susceptible to attack in the copper-rich interdendritic region of the weld structure. Solidification cracks were observed in high-dilution welds, but not if the dilution of the Monel® 60 filler metal by the 304L base metal was kept below about 30%. Thus, the present inventors are of the belief that avoidance of solidification cracks with a Monel® 60 filler metal on a 304 stainless steel substrate is possible if the dilution level is kept to no more than 30 to 40%.

While the use of pure argon gas for shielding resulted in surface contamination (slagging) and welds of unsatisfactory quality, the inventors discovered that use of an argon environment with 5% hydrogen shielding gas, in conjunction with control of weld heat input, significantly diminished this slagging effect. The inventors also noticed that the effect of slagging in the pure argon environment was worse at high heat inputs, possibly due to the presence of Ti in the Monel® 60 weld wire. The weld was found to be fully austenitic with perhaps some second phase formation in the interdendritic regions. Compositional profiles determined by scanning electron microscopy and energy dispersive spectrometer (SEM/EDS) from the base metal into the weld nugget of a particular Monel®/304L weld indicated that there was about 10% iron and a few percent of Cr in the weld nugget as a result of dilution. Also evident was a transition zone in which the composition changed from the base metal to the weld metal.

Mechanical Properties and Corrosion Testing

A Monel® 60/304L weld was tested by bending over a ¾" mandrel, resulting in 15% tensile strain in the outer fibers. The sample passed this test with no evidence of cracking. Microhardness profiling was performed along the weld cross-section. The hardness of the Monel® 60 weld metal is slightly below that of welds made with 308L filler metal. Transverse weld tensile tests also exhibited good weld ductility with tensile strengths comparable to those achieved in welds made under the same conditions with 308L filler material applied to a type 304L workpiece. In summary, the mechanical properties of the Monel® 60/304L welds were acceptable and meet the mechanical property requirements for 308L stainless steel welds.

The long term exposure tests on the Monel® 60/304L welds indicated that they have good corrosion resistance to mildly aggressive chloride solutions open to air. No attack was observed after exposure to 0.1M NaCl. After fifty days in artificial seawater the bottom side of the weld was attacked at the interface of the weld metal and base metal, but the top side was unattacked. Purposeful attack of the weld by aggressive etchants or polarization in chloride solution to high potentials revealed that the most susceptible region of the weld is the copper-rich interdendritic microstructure. In other words, the corrosion susceptibility is greatest at copper-rich segregated zones in the dendritic weld structure. This led the present inventors to undertake additional studies to determine if decreasing the copper content of the consumables would lead to improved corrosion behavior in the weld.

Accordingly, subsequent corrosion studies focused on alloys with copper content lower than the nominal 30% associated with Monel®. Corrosion testing was performed on welded samples and on buttons prepared by electric-arc melting of pure elemental mixtures. The buttons were tested in the as-cast and annealed conditions. A large matrix of compositions was tested within the following ranges: 0-45% copper, 0-3% palladium, 0-5% molybdenum and 0-67% dilution by 304L. Cyclic potentiodynamic polarization measurements and long term exposure tests were performed in 0.1M NaCl and artificial seawater. The present inventors found that compositions with between five and ten percent copper imparted desirable corrosion resistance properties, even for aggressive environments.

Figure 3:
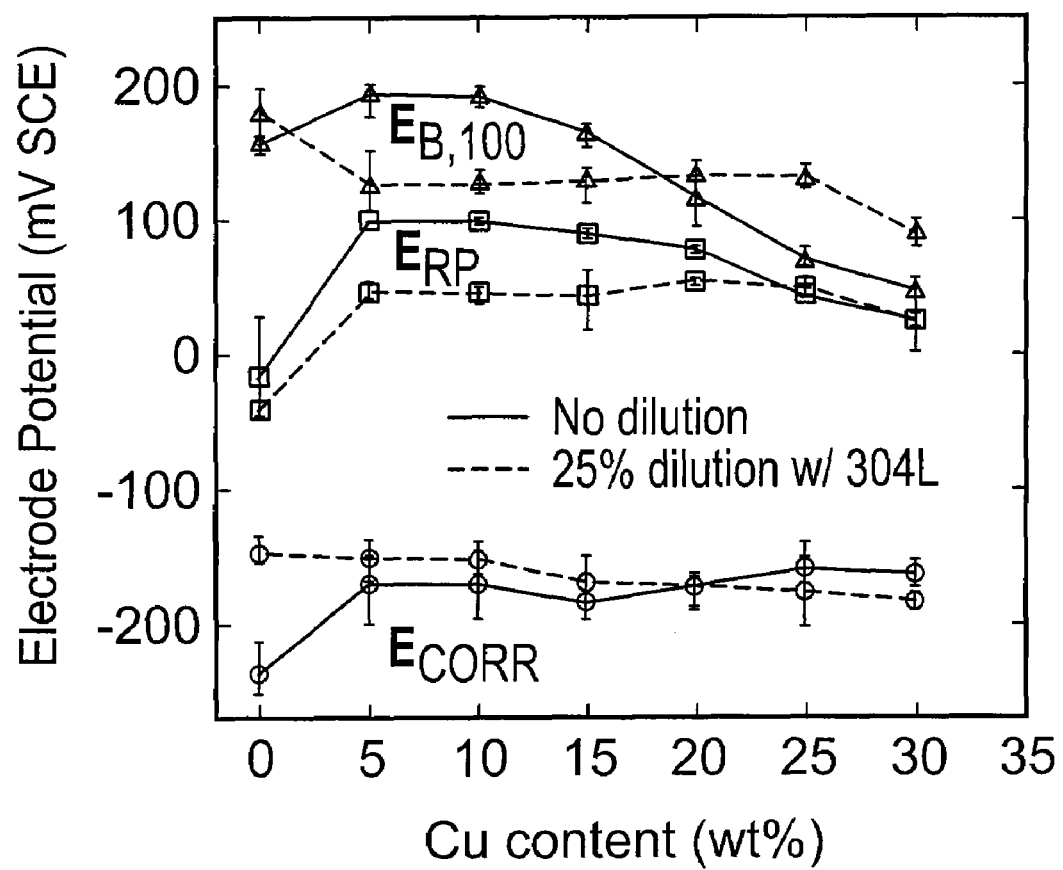
FIG. 3 graphically shows the effect of copper content and 25 percent dilution with 304L on corrosion potential, breakdown potential and repassivation potential of as-cast Ni—Cu—304L buttons in aerated 0.1M NaCl according to the present invention.
Figure 4:
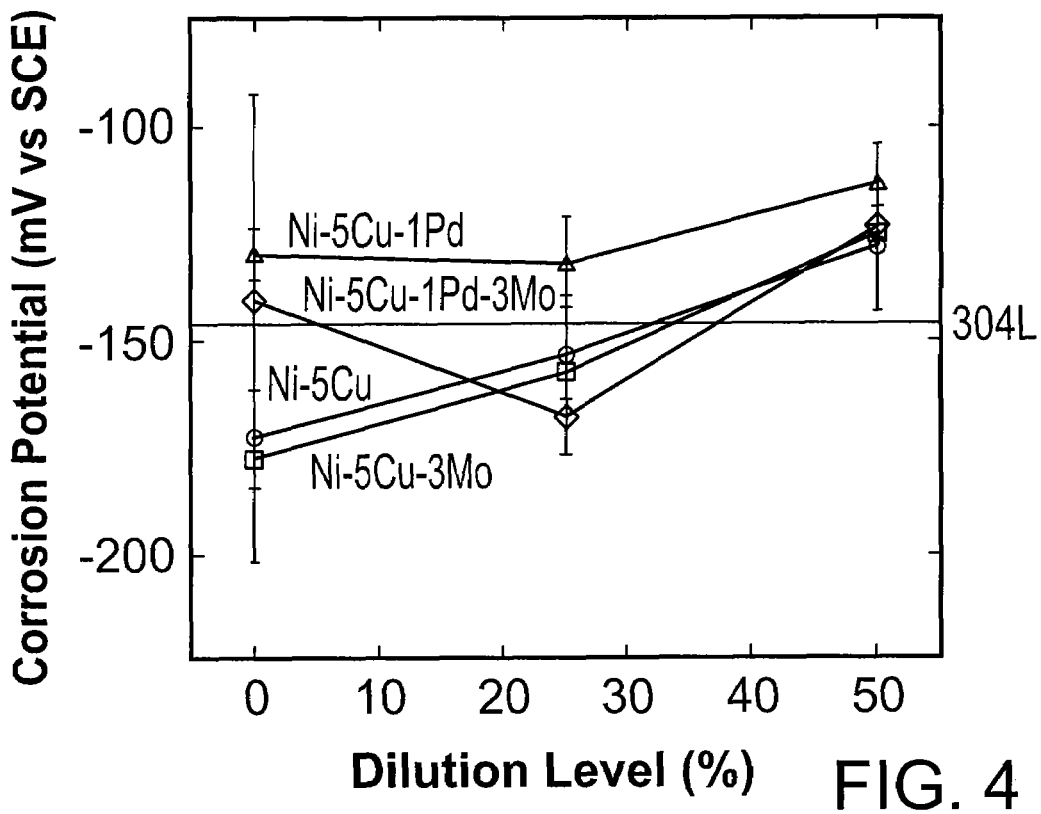
FIG. 4 graphically shows the corrosion potential of Ni-5Cu—X alloys as a function of dilution in aerated 0.1M NaCl according to the present invention.

Referring next to FIG. 3, the effects of copper content and 25% dilution are shown for as-cast nickel-copper alloys tested in 0.1M NaCl. Three characteristic potentials are provided for each condition: $E_{CORR}$, which is the corrosion or open circuit potential, $E_{B,100}$, which is the breakdown potential as indicated by the potential at which the current density is 100 µA/cm$^2$, and $E_{RP}$, which is the repassivation potential. For samples with no dilution, all three characteristic potentials increase as the copper content goes from 0 to 5%, which represents an improvement in performance. There is little difference in $E_{CORR}$ at higher copper contents, but the breakdown and repassivation potentials decrease when the copper content is above 10%. Both the breakdown and repassivation potentials are lower in this range of 5-10% copper when the alloy is diluted with 25% 304L. It should be noted that the values for 304L in this solution are: $E_{CORR}$=−144 mV SCE (shown, for example, in FIG. 4), $E_{B,100}$=291 mV SCE, $E_{RP}$=−94 mV SCE. The breakdown potential is higher than for these nickel-copper alloys, which reflects a greater intrinsic localized corrosion resistance. However, the $E_{RP}$ values of the alloys are higher than for 304L and the $E_{CORR}$ of both the stainless steel and the nickel-copper alloys are far below the alloy repassivation potentials. This is a good indication that the alloys will not suffer localized corrosion in this environment. This is in line with the good performance of Monel®/304L welds in long term exposure tests in 0.1M NaCl, and appears to be capable of even better performance than Monel®/304L welds in long term exposure to more severe environments.

Figure 5:
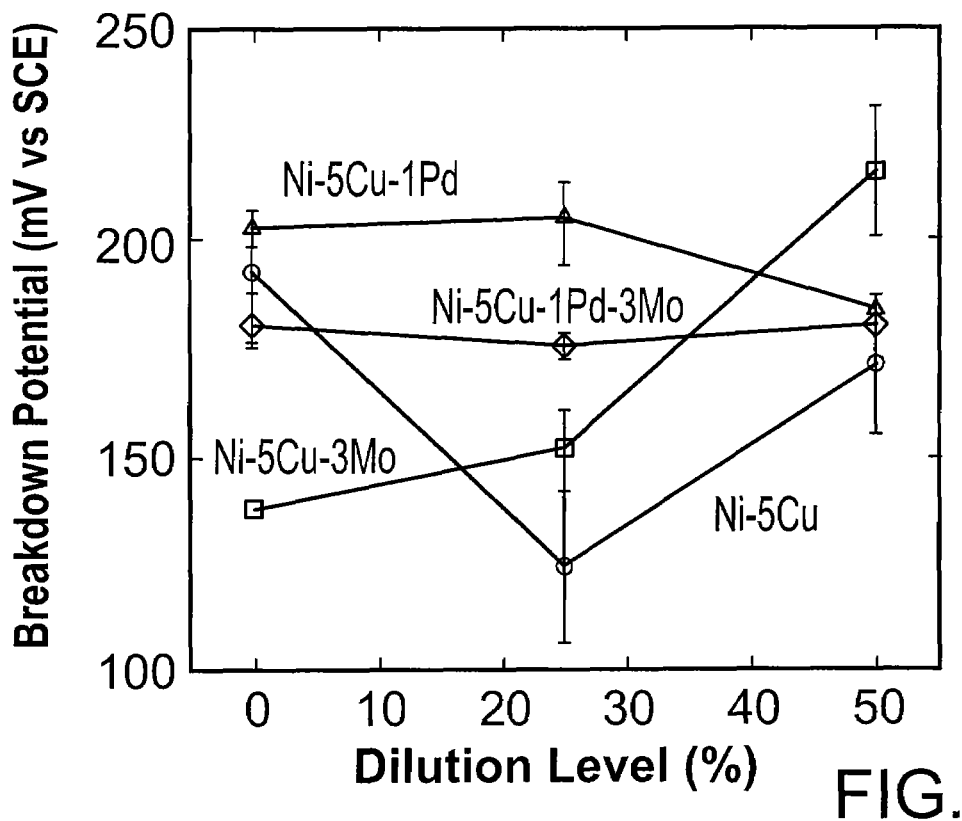
FIG. 5 graphically shows the breakdown potential of Ni-5Cu—X alloys as a function of dilution in aerated 0.1M NaCl according to the present invention.
Figure 6:
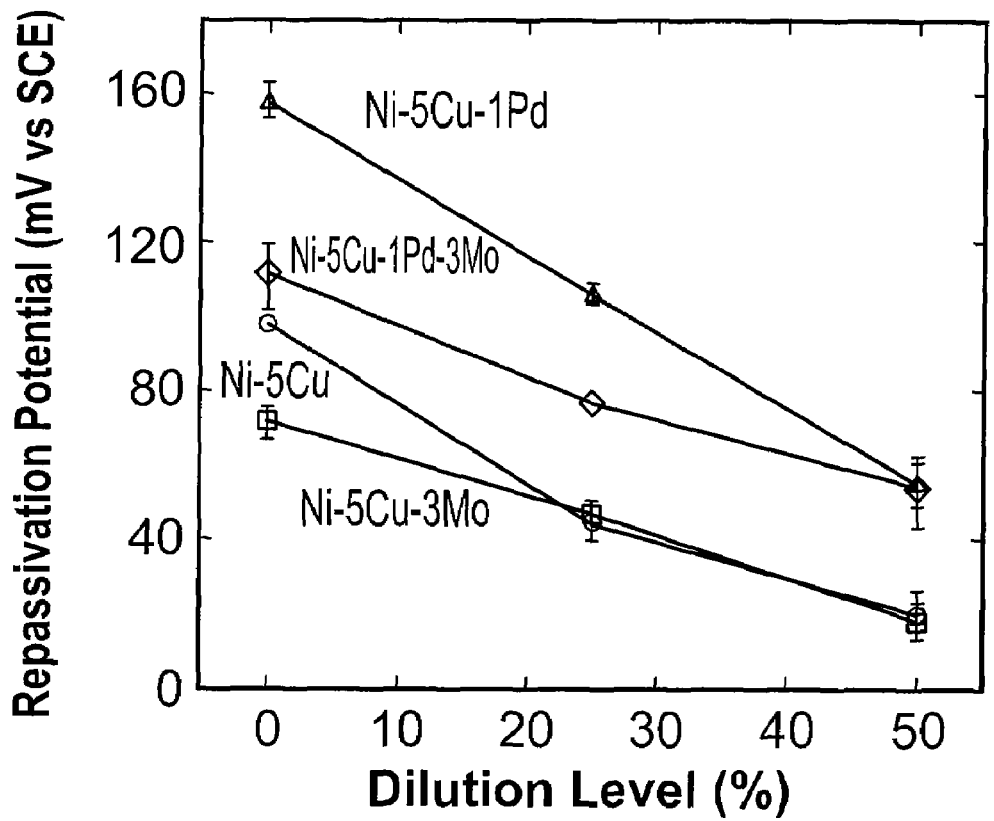
FIG. 6 graphically shows the repassivation potential of Ni-5Cu—X alloys as a function of dilution in aerated 0.1M NaCl according to the present invention.

As mentioned above, the best corrosion performance is found with a copper content of between five and ten percent by weight. The effects of alloying with small amounts of palladium and molybdenum were also studied. Palladium is of interest because it increases the resistance to localized corrosion and can ennoble alloys, which is beneficial because of the desire to slightly increasing the corrosion potential of the weld above that of the base metal. Molybdenum is often added to corrosion-resistant alloys to improve localized corrosion behavior. The behavior of Ni-5Cu is compared to that of Ni-5Cu-1Pd, Ni-5Cu-3Mo, and Ni-5Cu-1Pd-3Mo in FIGS. 4 through 6, which present the values of $E_{CORR}$, $E_{B,100}$, and $E_{RP}$ as a function of weld dilution. Of these, the Ni-5Cu-1Pd alloy exhibited the highest values of all three critical potentials, except for the extreme case of 50 percent dilution. In that instance, another of the alloys of the present invention, Ni-5Cu-3Mo, exhibited the highest breakdown potential. While the general trend appears to favor low (i.e., approximately five to ten percent copper concentrations), and one particular composition (Ni-5Cu-1Pd) appeared to demonstrate desirable values for all three characteristic potentials, it will be appreciated by those skilled in the art that the specific composition depends on numerous factors, including intended use, cost, corrosion and embrittlement resistance.

Palladium, as discussed above, imparts beneficial ennobling and related corrosion-resistance properties to welding consumables used on stainless steels. For example, the addition of Pd to a Ni-10Cu alloy weld material has been found to be beneficial for corrosion resistance. Nevertheless, its high cost may be a deterrent to its widespread use, even at a fraction of a percent concentration. Referring next to FIGS. 8 through 14C, the use of Ru, either as a substitute for or complement to Pd, is shown. Ru is the least costly of the platinum group metals (which includes, in addition to Pd and Ru, platinum (Pt), osmium (Os), iridium (Tr) and rhodium (Rh)), and adding it has been found to increase the corrosion resistance of passive metals such as stainless steel, Ti, and Cr.

Figure 8:
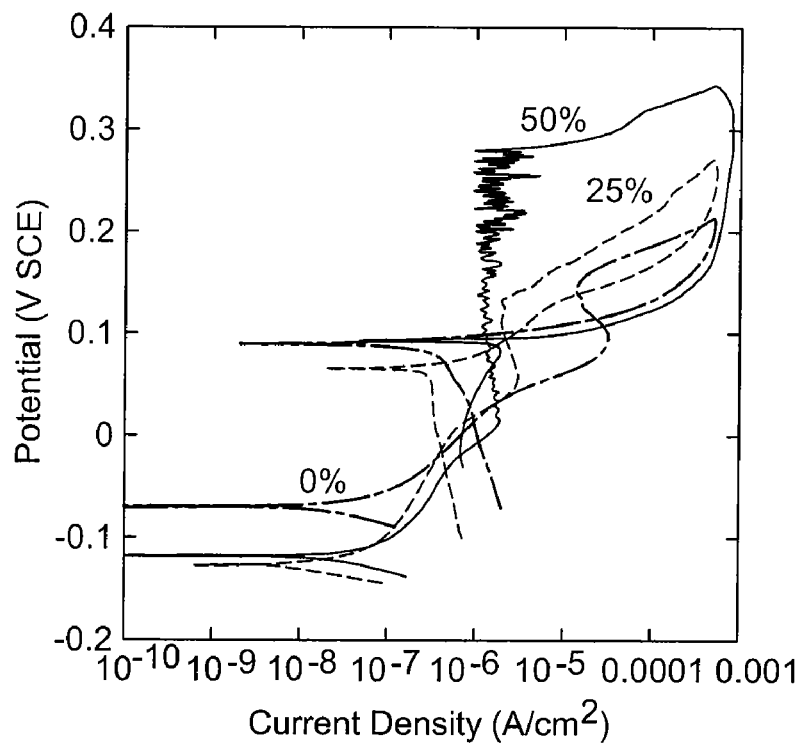
FIG. 8 illustrates cyclic polarization curves for Ni—Cu—Ru samples with varying dilution rates.

The present inventors tested welding consumables containing approximately eight percent by weight Cu and approximately one percent by weight Ru. Specifically, electrochemical tests were performed on button samples that were made by gas tungsten arc melting of welding wire of primary concentration Ni-8.2Cu-1.36Ru (with 0.56 Al, 0.53 Ti, 0.014 C, less than 0.001 N, 0.0031 O, less than 0.005 P and less than 0.001 Si, all amounts in percent by weight). This wire was made by casting and then working to a diameter of 3.15 mm. Referring with particularity to FIG. 8, different dilutions (0, 25 and 50 percent, all as shown) were achieved by melting 304L stainless steel chips together with pieces of the Ni—Cu—Ru wire. Cyclic polarization testing was performed on these button samples in an aerated 0.1 M NaCl solution, and the experimental data is summarized Table 3 as follows:

TABLE 3

Critical potentials measured from multiple potentiodynamic polarization experiments on as-cast buttons of Ni—Cu—Ru with different amounts of dilution

| Dilution (%) | OCP | Eb | Erp |
|---|---|---|---|
|  | −61.7 | 200 | 120 |
| 0 | −69.4 | 188.9 | 111.1 |
|  | −70 | 188.3 | 110 |
|  | −133.3 | 186.1 | 108.3 |
| 25 | −126.7 | 218.3 | 135 |
|  | −128.3 | 230.7 | 131.7 |
|  | −123.3 | 291.7 | 96.7 |
| 50 | −113.9 | 330.5 | 86.1 |
|  | −118.3 | 320.1 | 101.7 |

Figure 9:
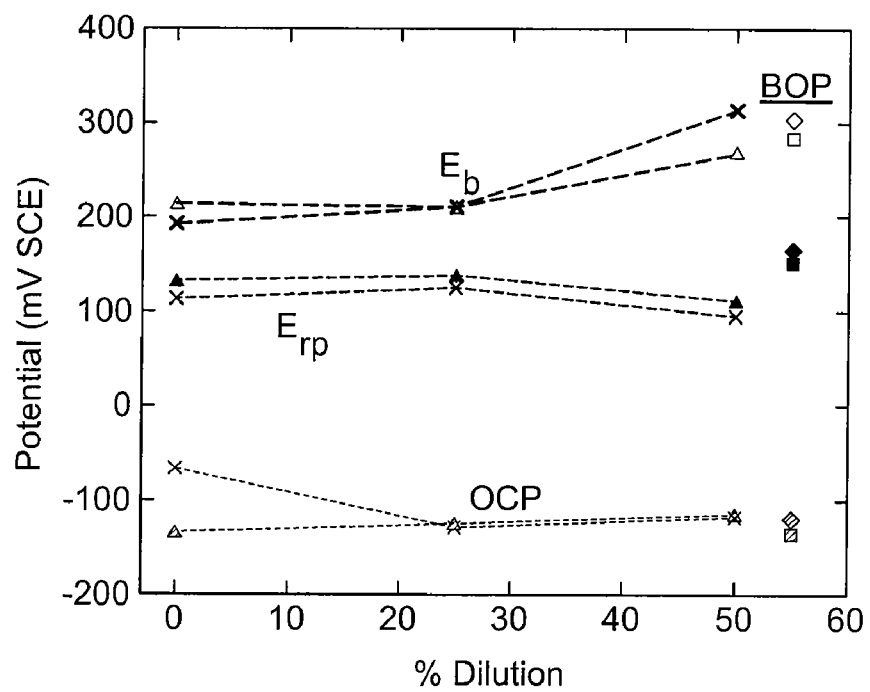
FIG. 9 illustrates critical potentials for Ni—Cu—Ru samples with varying Type 304 stainless steel dilution rates.

The breakdown potential $E_b$ (measured in millivolts SCE) tends to increase with increasing dilution, which may be due to an increase in Cr content. The repassivation potential $E_{rp}$ correspondingly decreases with increasing dilution. Essentially, as dilution increases, the weld contains more of the elements of stainless steel and behaves more like stainless steel. The Open Circuit Potential (OCP) of the zero percent dilution buttons are much higher than the rest of buttons, and FIG. 9 shows a comparison of critical potentials measured for three types of samples: buttons made from the Ru-containing welding wire, buttons made from pure Ni, Cu, and Ru at a ratio of 89Ni-10Cu-1Ru, and bead-on-plated welds made by melting pure elements into a hole in 304L stainless steel. The results are very similar, indicating that the effect of the minor alloying elements in the weld wire on corrosion properties of the weld is limited. FIG. 9 also shows critical potentials for Ni—Cu—Ru buttons containing different dilution of 304L stainless steel. Data with "x" symbols in the figure are for buttons fabricated from Ni—Cu—Ru wire starting material, while data indicated by the filled triangles are for buttons fabricated from pure elements. Data previously reported for bead-on-plate (BOP) welds is shown for comparison. In the drawing, data with "x" symbols are for buttons fabricated from Ni—Cu—Ru wire starting material, while data with the filled triangles are for buttons fabricated from pure elements. For the BOP welds, the data represented by the squares are for Ni-10Cu-0.5Ru and the diamonds for Ni-10Cu-1Ru.

Figure 10A:
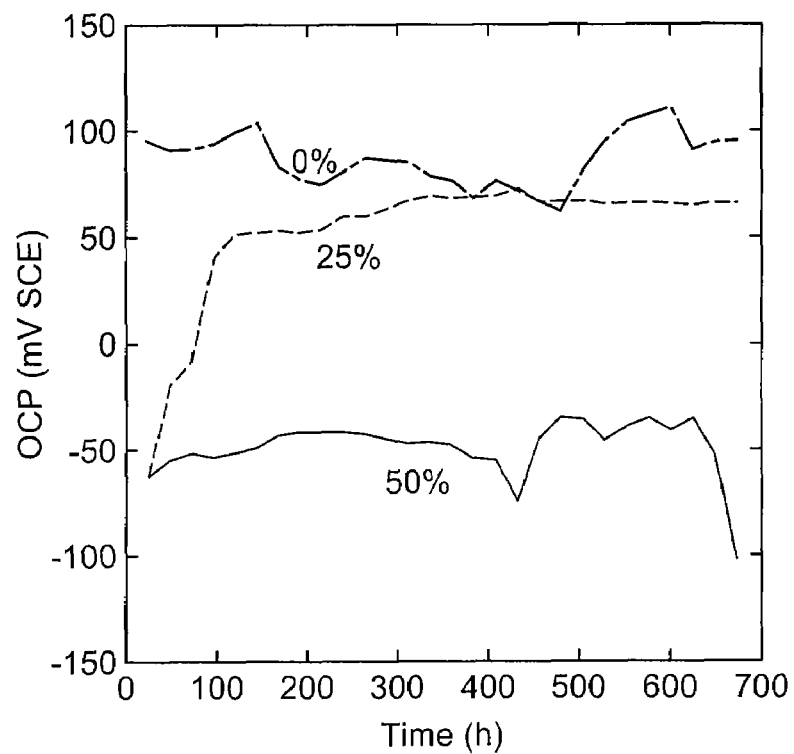
FIGS. 10A and 10B show the open circuit potential and polarization resistance measured during long time immersion tests for different levels of dilution.
Figure 10B:
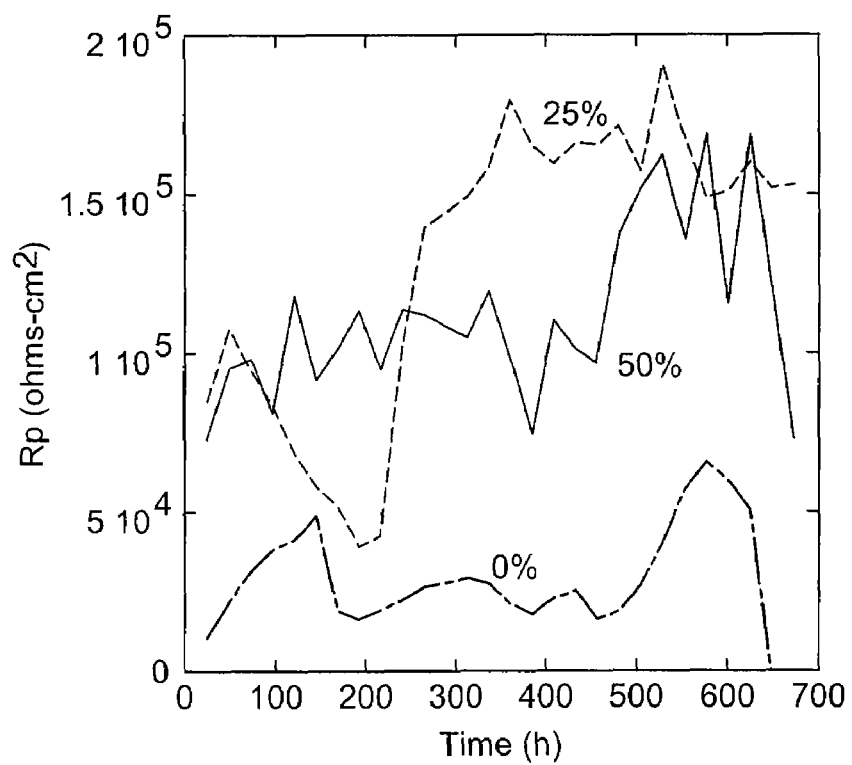

Referring next to FIGS. 10A and 10B, the OCP (FIG. 10A) and polarization resistance ($R_p$) (FIG. 10B) measured during long time immersion tests are shown for different dilutions. The polarization resistance is inversely proportional to corrosion rate. The button samples were cold rolled to a reduction of 75 percent, then connected with a Pt wire using spot welding and hung in aerated 1000 parts per million (ppm) NaCl solution for around 700 hours. The values were measured daily, with the results indicated in the figures. Similar tests were also performed on the Ni—Cu—Ru button samples mentioned above. In general, the OCP decreased with increasing dilution, with the 25 percent dilution sample exhibiting an increase in OCP over the first several days. The $R_p$ values were all similar in magnitude, with a tendency for higher $R_p$ at higher dilution. These results were consistent with the potentiodynamic polarization test results.

Figure 11:
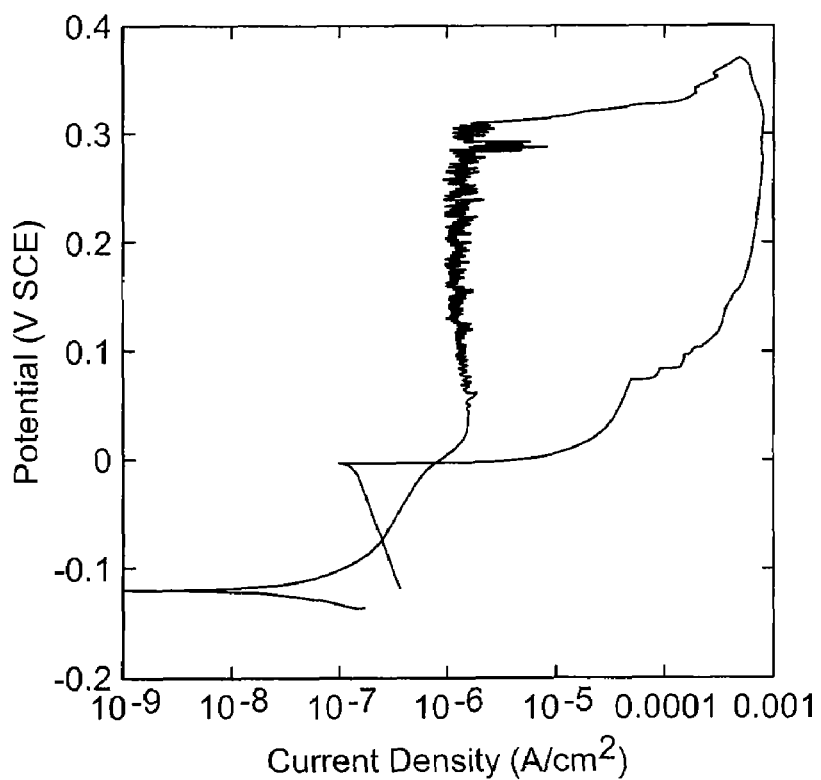
FIG. 11 shows the results of cyclic polarization tests of Ni—Cu—Ru welds made with the GTAW process with dilution of around 30 percent in an aerated 0.1 M NaCl solution.

Electrochemical tests were performed on sample Ni—Cu—Ru welds made with the GTAW process with dilution of around 30 percent. Cyclic polarization tests were performed in an aerated 0.1 M NaCl solution, as shown in FIG. 11. $E_b$ of the Ni—Cu—Ru weld was found to be higher than that of sample Ni—Cu—Pd welds made by the SMAW process, and also higher than that of a Ni-10Cu-1Ru button, while $E_{rp}$ was lower. Meanwhile, the OCP of the GTAW Ni—Cu—Ru weld samples discussed above was similar to those of the other welds. After the cyclic potentiodynamic polarization experiment, pits were found on both the weld and base metal, which might explain the relatively low $E_{rp}$. This is different than SMAW Ni—Cu—Pd sample and the Ni-10Cu-1Ru button, for which pits exclusively occurred on the weld surface, and is evidence of the resistance of the weld material.

Figure 12:
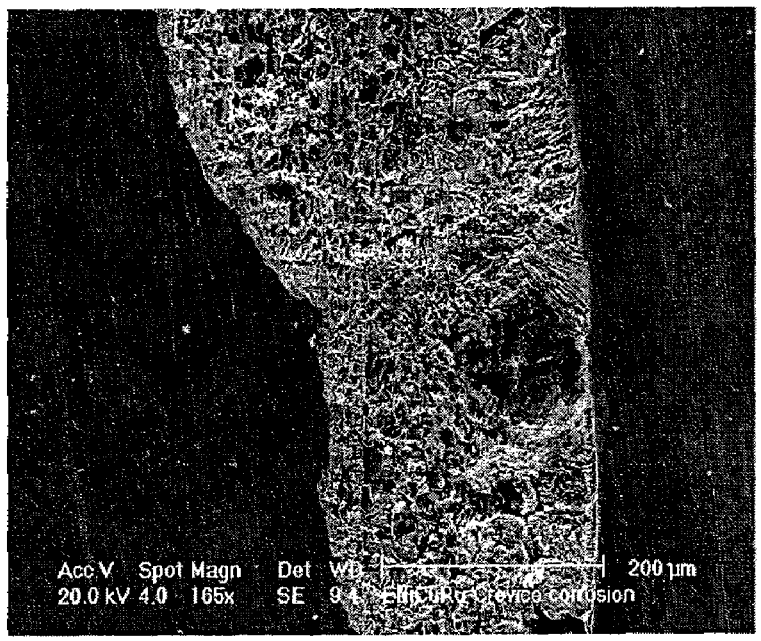
FIG. 12 shows the results of a crevice immersion test performed on the sample of FIG. 11.

Referring next to FIG. 12, crevice immersion tests were also performed on the GTAW Ni—Cu—Ru sample discussed above. The sample was connected to a Pt wire by spot welding and hung in an aerated 1000 ppm NaCl solution for around 500 hours. A crevice washer was used to create a crevice on the sample surface. An SEM image of the crevice on base metal of the sample was taken to show that after the experiment, only one crevice site was found, with the attack taking place on the base metal, similar to what has been observed for Ni—Cu—Pd welds.

Figure 13A:
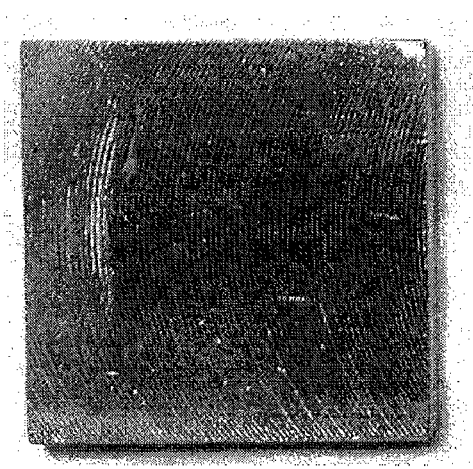
FIGS. 13A through 13C show the results of atmospheric exposure tests performed on a 308L stainless steel weld sample, a Ni-8Cu weld sample and a Ni-7.6Cu-1.3Pd weld sample.
Figure 13B:
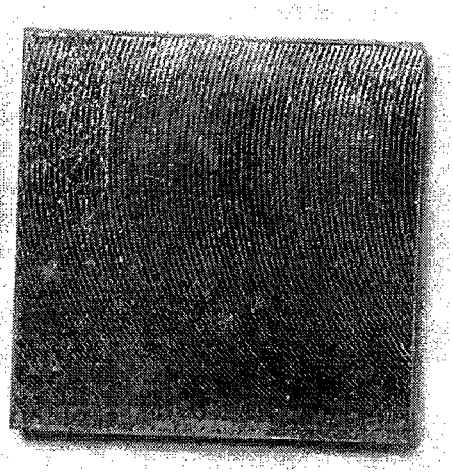
Figure 13C:
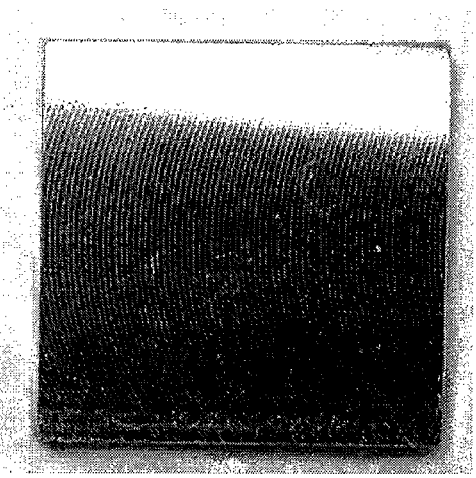

Additionally, atmospheric exposure tests were performed on four samples: a standard 308L stainless steel weld, a Ni-8Cu weld, a Ni-7.6Cu-1.3Pd weld, and a Ni—Cu—Ru weld made by GTAW. All of them are welded with 304 stainless steel base metal and have dilution of about 50 percent. The samples were put on the roof of MacQuigg Lab in Columbus, Ohio for exposure to a typical Midwest urban environment. The first three samples have been exposed since November, 2006 and the Ni—Cu—Ru weld since August, 2007, all having been checked regularly and photographed. After six months of atmospheric exposure, the first three welds showed no sign of corrosion, as shown in FIGS. 13A through 13C, where the Ni—Cu weld is shown in FIG. 13A, the Ni—Cu—Pd weld is shown in FIG. 13B and the 308L weld is shown in FIG. 13C, with the weld regions on the left of each sample. Likewise, the Ni—Cu—Ru weld (not shown) showed no sign of corrosion after four months. Starting at about nine months, the Ni—Cu and Ni—Cu—Pd welds have gradually exhibited increasing signs of corrosion on the weld regions, while the 308L weld showed less coloration than the other two.

Figure 14A:
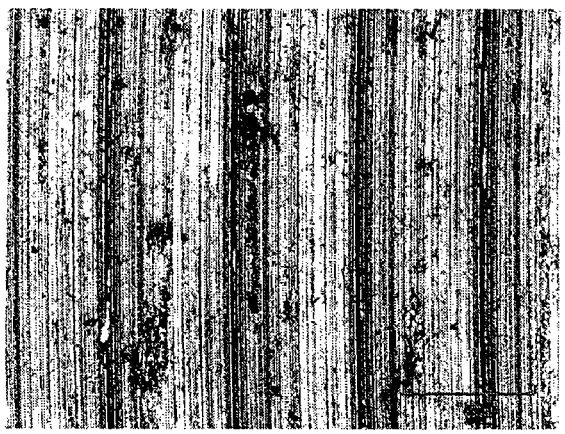
FIGS. 14A through 14C show optical microscopy examination at a higher magnification of the surfaces of the three samples of FIGS. 13A through 13C.
Figure 14B:
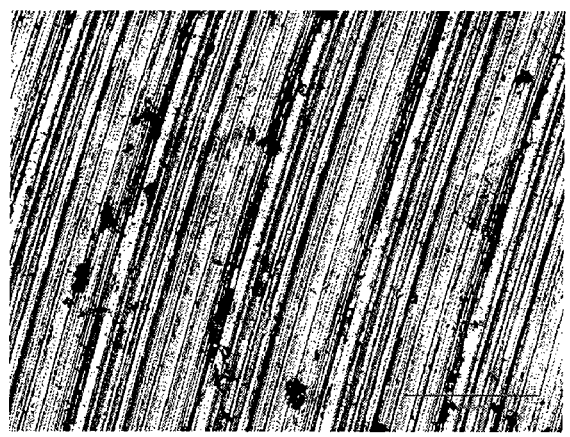
Figure 14C:
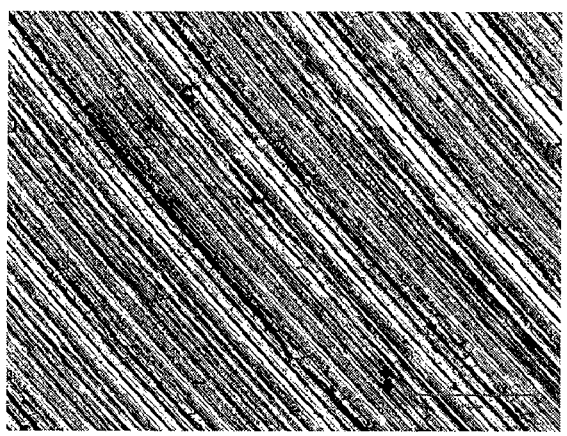

Close inspection of the figures will indicate that some reaction product can be observed on the left side of the Ni—Cu sample and the Ni—Cu—Pd sample after thirteen months of exposure. Optical microscopy examination at a higher magnification of the surfaces of the three samples after thirteen months exposure provides a more detailed view of the reaction, as shown in FIGS. 14A through 14C (where the micron marker in each image represents a distance of 400 μm) for the Ni—Cu weld (FIG. 14A), the Ni—Cu—Pd weld (FIG. 14B) and the 308L weld (FIG. 14C).

The results discussed above indicate that the effects of Ru as an alloying ingredient instead of Pd produce similar results for welding 304L stainless steel, where $E_b$ is below that of a comparable 304L stainless steel weld, $E_{rp}$ is much higher than that of a comparable 304L stainless steel weld, and OCP is much higher than that of a comparable 304L stainless steel weld. Likewise, notional welding design criteria are satisfied by nickel-based alloys that employ Ru in place of Pd. For example, because the $E_b$ and $E_{rp}$ of the Ru-containing alloy are well above the OCP of 304L stainless steel, there is a low likelihood of pitting or crevice corrosion. In addition, the OCP of the Ru-containing alloy is slightly higher than that of the 304L stainless steel alloy, thereby providing galvanic protection of the weld.

As such, the Ru-containing weld metal can act as a suitable substitute for the standard high-Cr 308L as a consumable for welding 304L stainless steel. In addition to possessing desirable localized corrosion and galvanic properties, welds made using Ru-containing consumables demonstrate sufficient mechanical properties. Significantly, the use of substantially Cr-free weld consumables as discussed herein has shown significant reductions in Cr present in the weld fumes, often more than an order of magnitude relative to conventional welding consumables. The present inventors have produced welding consumables that have shown significant reductions in hexavalent Cr production. For example, the Ni—Cu—Pd consumable achieved a measured hexavalent Cr reduction of over two orders of magnitude in recent tests, taking measured quantities from about 2.6 weight percent to about 0.02 weight percent. The inventors expect that the Ni—Cu—Ru welding consumable will produce similar reductions. Other, more specific compositions are also believed to provide chromium-reducing benefits, including a nickel-based alloy with 7.5 weight percent Cu, 1 weight percent Ru, 0.5 weight percent Al, 0.5 weight percent Ti and 0.02 weight percent C.

While certain representative embodiments and details have been shown for purposes of illustrating the invention, it will be apparent to those persons skilled in the art that various changes in the methods and apparatus disclosed herein may be made without departing from the scope of the invention.

What is claimed is:

1. A substantially chromium-free coated electrode for welding a stainless steel base metal, said coated electrode comprising:
   between approximately 1 weight percent and 2 weight percent ruthenium;
   between approximately 5 weight percent and approximately 10 weight percent copper; and
   a balance of nickel and up to 5 weight percent other alloying ingredients such that upon welding said stainless steel base metal, fumes from a weld pool produced by said welding contain substantially no hexavalent chromium.

2. The coated electrode of claim 1, wherein said between approximately 1 weight percent ruthenium and approximately 2 weight percent ruthenium comprises between approximately 1.3 weight percent and approximately 1.4 weight percent ruthenium, and wherein said between approximately 5 percent and approximately 10 weight percent copper comprises approximately 8 weight percent copper.

3. The coated electrode of claim 2, wherein said between approximately 1.3 weight percent and approximately 1.4 weight percent ruthenium comprises approximately 1.36 weight percent ruthenium and said approximately 8 weight percent copper comprises approximately 8.2 weight percent copper.

4. The coated electrode of claim 1, wherein at least some of said alloying ingredients are elements.

5. The coated electrode of claim 1, wherein said between approximately 5 percent and approximately 10 weight percent copper comprises approximately 7.5 weight percent copper, and said up to 5 weight percent other alloying ingredients comprises approximately 0.5 weight percent aluminum, approximately 0.5 weight percent titanium and approximately 0.02 weight percent carbon.

6. A substantially chromium-free nickel-based coated electrode comprising up to approximately 10 weight percent copper, between approximately 1 weight percent and approximately 2 weight percent ruthenium and up to 5 weight percent other alloying ingredients such that said coated electrode is defined by a corrosion potential at least as high as a stainless steel workpiece to which said coated electrode is configured to be joined, a breakdown potential greater than the workpiece and a repassivation potential greater than the workpiece.

7. The coated electrode of claim 6, comprising approximately 8.2 weight percent copper and approximately 1.4 weight percent ruthenium.

8. The coated electrode of claim 6, comprising approximately ten weight percent copper and approximately 1 weight percent ruthenium.

9. The coated electrode of claim 6, comprising approximately 7.5 weight percent copper and approximately 1 weight percent ruthenium.

10. The coated electrode of claim 9, further comprising up to approximately 2 weight percent of each aluminum and titanium and up to approximately 0.1 weight percent carbon.

11. The coated electrode of claim 10, further comprising up to approximately 0.5 weight percent of each aluminum and titanium and up to approximately 0.1 weight percent carbon.

12. A method of welding a stainless steel base material, said method comprising:
providing a chromium-free welding consumable comprising up to approximately 10 weight percent copper, between approximately 1 weight percent and approximately 2 weight percent ruthenium and a balance of nickel and up to 5 weight percent other alloying ingredients; and
welding said base material with said welding consumable to produce a welded composition such that fumes from a weld pool produced by said welding contain a substantial reduction in hexavalent chromium concentration relative to that produced using a chromium-containing welding consumable.

13. The method of claim 12, wherein said up to approximately 10 weight percent copper comprises between approximately 5 weight percent and approximately 10 weight percent copper.

14. The method of claim 13, wherein said between approximately 5 weight percent and approximately 10 weight percent copper comprises between approximately 7.5 weight percent and approximately 10 weight percent copper.

15. The method of claim 13, wherein said between approximately 5 weight percent and approximately 10 weight percent copper comprises approximately 8.2 weight percent copper, while said between approximately 1 weight percent and approximately 2 weight percent ruthenium comprises between approximately 1.3 weight percent and approximately 1.4 weight percent ruthenium.

16. The method of claim 12, wherein said up to 5 weight percent other alloying ingredients comprises up to approximately 2 weight percent of each aluminum and titanium and up to approximately 0.1 weight percent carbon.

17. The method of claim 16, wherein said up to approximately 2 weight percent of each of aluminum, and titanium comprises approximately 0.5 weight percent of each.

18. The method of claim 12, wherein said between approximately 1 weight percent and approximately 2 weight percent ruthenium comprises between approximately 1.3 weight percent and approximately 1.4 weight percent ruthenium.

19. The method of claim 12, wherein said reduction in hexavalent chromium concentration relative to that produced using a chromium-containing welding consumable is approximately two orders of magnitude.

20. A substantially chromium-free flux-cored wire for welding a stainless steel base metal, said wire comprising:
between approximately 1 weight percent and 2 weight percent ruthenium;
between approximately 5 weight percent and approximately 10 weight percent copper; and
a balance of nickel and up to 5 weight percent other alloying ingredients such that upon welding said stainless steel base metal, fumes from a weld pool produced by welding said wire and said base metal contain substantially no hexavalent chromium.

21. A substantially chromium-free nickel-based flux-cored wire comprising up to approximately 10 weight percent copper, between approximately 1 weight percent and approximately 2 weight percent ruthenium and up to 5 weight percent other alloying ingredients such that said wire is defined by a corrosion potential at least as high as a stainless steel workpiece to which said wire is configured to be joined, a breakdown potential greater than the workpiece and a repassivation potential greater than the workpiece.

* * * * *

UNITED STATES PATENT AND TRADEMARK OFFICE
Certificate

Patent No. 7,696,453 B2                                                                                 Patented: April 13, 2010

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Gerald S. Frankel, Columbus, OH (US); John C. Lippold, Hillard, OH (US); and Dong Liang, Columbus, OH (US).

Signed and Sealed this Twelfth Day of February 2013.

*ROY KING*
*Supervisory Patent Examiner*
*Art Unit 1733*
*Technology Center 1700*